(12) United States Patent
Sacchetti

(10) Patent No.: US 10,778,777 B2
(45) Date of Patent: Sep. 15, 2020

(54) INTELLIGENT SYSTEM FOR MONITORING A REFERENCE ENVIRONMENT, SUITABLE FOR MULTISENSORAL INTERACTION WITH A USER

(71) Applicant: TERA SRL, Conversano (IT)

(72) Inventor: Antonio Sacchetti, Conversano (IT)

(73) Assignee: Tera Srl, Conversano (IT)

( * ) Notice: Subject to any disclaimer, the term of this patent is extended or adjusted under 35 U.S.C. 154(b) by 0 days.

(21) Appl. No.: 16/349,138

(22) PCT Filed: Nov. 10, 2017

(86) PCT No.: PCT/IB2017/057047
§ 371 (c)(1),
(2) Date: May 10, 2019

(87) PCT Pub. No.: WO2018/087708
PCT Pub. Date: May 17, 2018

(65) Prior Publication Data
US 2019/0289077 A1  Sep. 19, 2019

(30) Foreign Application Priority Data
Nov. 11, 2016 (IT) .......................... 102016000114194

(51) Int. Cl.
*H04L 29/08* (2006.01)
*G08B 7/06* (2006.01)
(Continued)

(52) U.S. Cl.
CPC .............. *H04L 67/125* (2013.01); *G08B 7/06* (2013.01); *H04B 3/542* (2013.01);
(Continued)

(58) Field of Classification Search
CPC . H04L 67/125; H04L 12/44045; H04L 67/24; H04L 69/18; H04W 4/70; H04B 3/542; G08B 7/06
(Continued)

(56) References Cited

U.S. PATENT DOCUMENTS

2007/0299561 A1* 12/2007 Montaser .............. B05B 12/082
700/283
2016/0007421 A1* 1/2016 Tey Pons ........... H05B 33/0854
315/113
(Continued)

FOREIGN PATENT DOCUMENTS

WO  2016/102983 A1  6/2016

OTHER PUBLICATIONS

International Preliminary Report on Patentability, International Application No. PCT/IB2017/057047, dated May 14, 2019, 7 pages.
(Continued)

*Primary Examiner* — Ojiako K Nwugo
(74) *Attorney, Agent, or Firm* — Stinson LLP

(57) ABSTRACT

Intelligent system (1) for monitoring a reference environment, suitable for multisensorial interaction with a user, comprising:
at least one multiprotocol control unit (2), provided with at least one internal wireless modem (16), a power supply connector (71), a microprocessing unit (15), RAM memory means (13), program memory means (12) and data memory means (14);
at least one modem, respectively a modem-router, external (30) with respect to the control unit (2) and operatively connected to the same;
wherein said system (1) further comprises:
sensor means, internal with respect to the control unit (2);
(Continued)

a plurality of actuator means external (20) with respect to the control unit (2);

sensor means external with respect the control unit (2);

wherein:

said sensor means internal with respect to the control unit (2) which are, individually or in combination, at least a microphonic sensor (3), a relative humidity sensor (4), a temperature sensor (5), respectively an atmospheric pressure sensor (6) or the like, detect at least a first value of the reference environment;

said sensor means (10, 11) external with respect the control unit (2), operatively connected to the control unit (2), detection at least a second value of the reference environment;

and comprises:

computer means internal to said control unit (2), provided with software means (80) for processing at least one probability index of presence of a user in the reference environment, on the basis of said at least a first, respectively second value, detected by means of said internal (3, 4, 5, 6), respectively external (10, 11), and for processing of at least a first, respectively second, value of said reference environment, detected by means of said internal (3, 4, 5, 6), respectively external (10, 11) sensor means, respectively of said probability index, for obtaining at least a first, respectively a second, corresponding environmental parameter, referring to at least one environmental condition of the reference environment, and forwarding, on the basis of said parameters in this way obtained, at least one command to:

actuator means, internal with respect to the control unit (2), which are, individually or in combination, multi-color light emitter means (7), loudspeaker means (8), a nebulized and/or vaporized fragrances dispensing devices (9) or the like, and respectively external (20), to provide at least one sensory feedback message referring to one or more conditions of said reference environment to the user.

15 Claims, 7 Drawing Sheets

(51) Int. Cl.
*H04B 3/54* (2006.01)
*H04L 12/40* (2006.01)
*H04L 29/06* (2006.01)
*H04W 4/70* (2018.01)

(52) U.S. Cl.
CPC ........ *H04L 12/40045* (2013.01); *H04L 67/24* (2013.01); *H04L 69/18* (2013.01); *H04W 4/70* (2018.02)

(58) Field of Classification Search
USPC .......................................... 340/538
See application file for complete search history.

(56) References Cited

U.S. PATENT DOCUMENTS

2016/0102983 A1\* 4/2016 Javed ................... G01C 21/206
701/532
2016/0116343 A1\* 4/2016 Dixon ....................... G01J 1/44
250/342

OTHER PUBLICATIONS

International Search Report, International Application No. PCT/IB2017/057047, dated Jan. 25, 2018, 2 pages.

\* cited by examiner

INTELLIGENT SYSTEM FOR MONITORING A REFERENCE ENVIRONMENT, SUITABLE FOR MULTISENSORAL INTERACTION WITH A USER

CROSS-REFERENCE TO RELATED APPLICATIONS

This application is a national stage application of PCT/IB2017/057047, filed Nov. 10, 2017, which claims the benefit of Italian Patent Application No. 102016000114194, filed Nov. 11, 2016, the contents of which are incorporated by reference in their entirety for all purposes.

FIELD OF THE INVENTION

The present invention generally refers to building management and monitoring systems (reference environment), which can provide information about building conditions in terms of environmental comfort, energy efficiency and safety, in relation to different areas of the building, its structure and its users.

In particular, the present invention relates to an intelligent system suitable for the interaction between building environment and a control unit (smart gateway device), between the control unit and cloud-based back-end system and between the control unit and the user.

STATE OF THE ART

Domotic systems, now commonly identified as internet of things, "IoT" for smart building and smart home, are complex, difficult to install and often expensive systems; their complexity is the cause of the user's fatigue in using the system and abandonment and indifference towards his functions.

In addition, regarding the management and, therefore, the checks of the functions of such systems, these are always done by the user, either by computer or, remotely, by mobile device; if the user wants to check the home energy efficiency should always connect to internet and check out by pc or mobile device; such setting, of the known systems, in the long run, will turn away the user from his engagement in using these control units.

Currently known systems do not allow the user to an easily consumption viewing, except by using suitable applications for smartphone/PC that can only be used by some users.

Firstly, the system object of the invention solves the problem of continuous engagement of the user in such a way that said engagement would be of interest of any user segment, the elderly, the children, even the low-tech users as well as people with disabilities (e.g. blind, hearing impaired); in order to engage the user, the present system jointly deals with another problem, intimately linked to the user's interest, that is to check with greater precision and reliability the presence of the user in the building.

From the analysis of the state of the art, the following documents emerged:

The utility model CN204707135, "HEMS family energy gateway based on the internet of things" illustrates a three-layer system, the Perception Layer (Sensors), Network Layer (Gateway) and Application Layer (Statistics, Analysis, Display, Feedback and Control). This system is intended to be used preferably in China, with 780 MHz frequencies, not usable elsewhere, and with a service such as "95598 interactive web services" which appears to be intended for power provider operators_in the Chinese market. This document makes no reference to solving the technical problem of checking the presence of the user in the reference environment to provide feedback directly via actuators internal to the control unit. In addition, it does not provide remote re-programmability but only via RS485;

the patent document TW201347240 "A System and Method of Appropriate Services Detection for a Smart Building" focuses on a distributed architecture for building management with remote intelligence feature by cloud-service, with algorithms that detect correlations between events and provide suggestions to the user, also based on the measurement of the electrical consumption of the appliance. However, said system does not include multisensory feedback features to the user by the gateway and the smartphone, nor does it have internal gateway sensors, therefore it does not provide for a minimal installation allowing, only with the control unit, to provide features;

The document "A Smart Multy-Sensory System for Environmental Monitoring DIEEI" refers to algorithms for sensing the human presence, based only on sensors internal to the gateway. Among these sensors, however, there is no reference to either the relative humidity or the atmospheric pressure sensors; it does not provide specific measurements of energy consumption; does not include the use of the smartphone as input and generally does not include any specific type of output, either in terms of execution or feedback to the user, except for the PIR sensor light; does not specify back-end features on external servers, nor remote update of the firmware of the control unit; finally, there is no mobile application that guarantees interaction with the user by means of smartphones;

The US patent US2003050737 (A1) "Energy-smart home system" discloses a complex home automation system, based on an intelligent junction box, wherein benefits are provided in the energy management of the building adding to each building socket, energy measurement, temperature sensing, voice, motion, video camera, displays and speakers, processing of all information, and communication over powerline to a PC and Internet features. In said system there is no reference to algorithms based on the multisensory detection of the presence of the user, which is however detected only with motion sensor, or, at least, there is no combination of atmospheric pressure-sound-humidity-temperature sensing to detect the presence of the user;

The patent EP1946790 (A1) "Multisensorial diffuser with wellness sequences related to meditation, sleep, relaxation and energy" relates to a remote programmable multisensory diffuser that can spread four reference therapies in the environment: aromatherapy, chromotherapy, music therapy and applied crystallotherapy. The remote programmable device is not however described from the connectivity point of view, and it is updated by replacing a memory card. The device does not use multisensorial distributions in accordance to the state of the building, that is processed on the base of sensors values, it does not interact with the user, it does not interact by means of a device software with an external server able to provide advanced services based on data analysis and decision support system algorithms as it does in the invention object of the present document.

The aim of the present invention is to solve all the disadvantages of the state of the art.

In particular, the invention provides an original solution to the problem of providing a system for monitoring a reference environment that is suitable for multisensory interaction with the user, allowing a continuous user's engagement that could be addressed both to all users of any age segment and also people with disabilities.

A further problem solved is that the flow of information to the user (alerts and suggestions through applications, and multisensorial feedback, automation of the devices facing the energy consumption, the comfort and the security of the building) is performed in the presence of the user in the building; the check of the presence of the user in the building is detected through an original combination of elements that include both physical sensors and the same user, considered himself a source of information.

Regarding to the aspect of detection of the user presence in the environment, the present invention addresses some problems associated with the present use of known sensors. The most common used sensors are motion sensors; said sensors operate effectively as presence sensors only if the user is in a situation of continuous motion; sometimes the presence in the environment of a person that does little movements or is stationary, it may not be detected.

Other commonly used sensors are the beacon based sensors that require, on the other hand, that the user always wear the RF emitter; these sensors from a certain point of view, solve the problem of missing detection performed by motion sensors since, being the RF emitter always worn by the user, this would allow to verify the presence of a person in the environment even if this person is stationary; on the other hand also these sensors have limits as they may be forgotten switched off or not worn by the user.

Both these systems create false alarm issues.

Whereas, on the contrary, the original combination of input parameters of the present invention, minimize false alarms and increase precision and accuracy of the information related to the presence of the user in the reference environment.

SUMMARY OF THE INVENTION

The problems described above are solved through a system for monitoring the reference environment suitable for multisensory interaction with the user consisting of:
- a multiprotocol control unit provided with internal sensors and actuators as well as internal and external communication devices (modems), with data processing and storage means, in relation to the building in which is located;
- external sensors and actuators;
- processor means comprising:
  - control unit's software;
  - back-end's software, not resident in the building/home but on server I/cloud, having data processing and storage functions for all the multiprotocol control units in the different environments, as well as web-accessible data from several sources, including open data;
  - application software, running on smartphones or tablets, which interact with both the control unit and with said processors means; the features of the applications is in part also available by web access from any terminal, even PC, through common browsers.

The system object of the present invention has the following functions:
- gateway function (wireless, wired, LAN, WAN/internet), by means of the multiprotocol control unit;
- data acquisition function by means of sensors internal to the control unit (atmospheric pressure sensor) and external (device such as smartphones and tablets that, by means of application, provide information coming from the sensors physically present on smartphone/tablet and information entered by the user in response to the feedback). Information from all sensors are processed to provide the information about the probability of the user presence in the building, key information for the software (smart gateway software, back-end, and smartphone and PC applications) to produce feedback to the user and automatic operations toward loads and actuators;
- function of data and commands sending to the internal actuators (light, acoustic emitters, fragrance dispensers) and external, physical and virtual (smartphone and tablet which, by means of application, provide alert and notification) providing a multisensory feedback about the state of the building;
- supervisory, coordination and data processing function with high-performance computational resources given to the smart gateway and, therefore, to the whole building technological system, through the internet connection with a server provided with a back-end software, also capable of remote upgrading the control unit software, as well as sending instructions that overwrite the decisions independently processed by the smart gateway.

The problem of continuous user's engagement on building status information is solved by means of a system that uses the interaction among said functions in order to provide a multi-sensory communication with the user.

The present invention also solves the problem of improving said interaction between the user and the reference environment (reference environment means also a portion of a building) providing a system for managing the environmental parameters of buildings and dwellings in which there is a two-way communication between the user and the system by means of the control unit.

Another problem solved is the provision of an easy interaction of the system with the user in such a way that the latter is motivated to continue its use.

A further advantage of the system object of the invention is to enable the control of devices and installations in the building in order to optimize energy consumptions, safeguarding comfort and safety, in a more effective way than the known systems; indeed, by increasing the reliability of the user presence detection function in the reference environment, it is possible to implement more effective energy efficiency logics (for example switching off devices in the event of prolonged absence of people) by means of an active engagement of the user, whose awareness of energy consumption and their relationship with its behavior is essential; said engagement is provided by means of simple and innovative integrated feedback elements, visual, acoustic and olfactory.

The system therefore solves, as a whole, the problem of the continuous engagement of any type of user elderly, children, disabled people, even people who are not used to technologies.

Another advantage of the system is the constant engagement of the user over time and, consequently, the energy efficiency and building consumption awareness that the user acquires.

In addition, the present system is characterized by its modularity and scalability, that is the possibility for the user to start with a basic kit (simplified) consisting of a multi-protocol control unit and a consumption measurement device; the multiprotocol control unit is also compatible with all devices available on the market and, in case of interaction with innovative devices, it can be upgraded.

Other aspects, features and uses of the intelligent system for monitoring the reference environment suitable for multisensory interaction with the user according to the present invention are defined below with reference to the detailed description of an embodiment, disclosed for exemplification purposes illustrated in the following figures.

LEGEND

Figure 1:
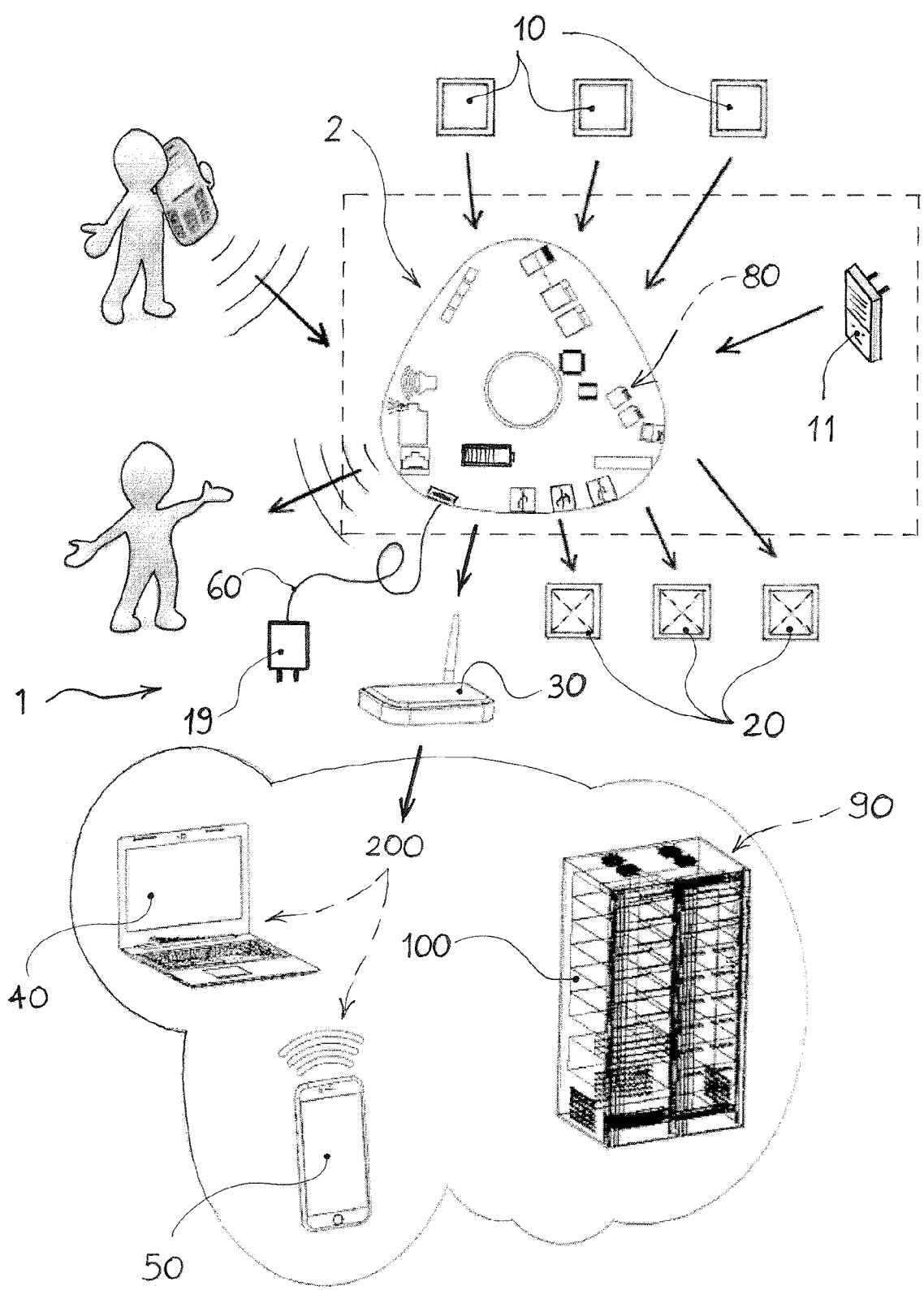
FIG. 1—a schematic view of the user interaction system, including the reference environment or the kit, consisting of the multiprotocol control unit and the consumption measurement device, sensors and actuators, the external router, and a representation of the devices that communicate with the control unit via internet.

1: Intelligent system according to the present invention;
2: Multiprotocol control unit;
3: Internal microphonic sensor;
4: Internal relative humidity sensor;
5: Internal temperature sensor;
6: Internal atmospheric pressure sensor;
7: Multicolor light emitter;
8: Loudspeaker;
9: Nebulized and/or vaporized fragrances dispensing devices;
10: External sensors;
11: Consumption measurement device with on-off control;
12: Program memory;
13: RAM memory;
14: Data memory;
15: Microprocessing unit;
16: Internal wireless modem;
17: Universal Input-Output serial ports;
18: Battery
19: Power supply with USB/PLC converter;
20: External actuators;
30: External modem/router;
40: PC terminal;
50: Mobile device;
60: Connection devices;
70: Connectors;
71: Power-over-USB connector of the power supply 19;
72: Dedicated data memory connector 14 and program memory connector 12;
80: Smart-gateway software;
90: Back-end software;
100: Server
200: Software configured as an application
500: Kit

DESCRIPTION OF THE INVENTION

The intelligent system 1, according to the invention, for monitoring a reference environment suitable for multisensorial interaction with a user, comprises:

at least a multiprotocol control unit 2, provided with at least one internal wireless modem 16, a power supply connector 71, a microprocessing unit 15, a RAM memory 13, a program memory 12, and data memory 14;

at least one modem, respectively a modem router, external 30 with respect to the control unit 2 and operatively connected to the same;

sensors, internal with respect to the control unit 2, which are, individually and in combination, a microphonic sensor 3, a relative humidity sensor 4, a temperature sensor 5, an atmospheric pressure sensor 6 or the like, for the detection at least a first value of the reference environment;

actuators, internal with respect to the control unit 2, which are, individually or in combination, multicolor light emitter 7, loudspeaker 8, a nebulized and/or vaporized fragrances dispensing devices 9, or the like, and a plurality of actuators 20, external with respect to the control unit 2;

sensor 10 and 11 external with respect to the control unit 2, operatively connected to the control unit 2 for the detection at least a second value of the reference environment;

computer means internal to said control unit 2, provided with software means 80.

The multiprotocol control unit 2 according to the invention performs gateway functionality; it is, therefore, equipped with several internal wireless modems 16 providing:

"LAN" type wireless communications (Wi-fi, BT-including BT-LP, 802.15.4-Zigbee, Thread, 6Lowpan . . . etc., WMBus, Zwave, Lora);

"LAN" type wired communications (Ethernet port eRS485, powerline communications port by means of intelligent power supply);

Internet communications via GPRS/UMTS mobile public network, 5G public mobile network or ADSL wired public network or other type, using external modem and modem routers, such as Universal Input-Output serial ports or in general on LAN or via wireless LAN;

other possible types with USB connectors and remote upgrade function.

Figure 6:
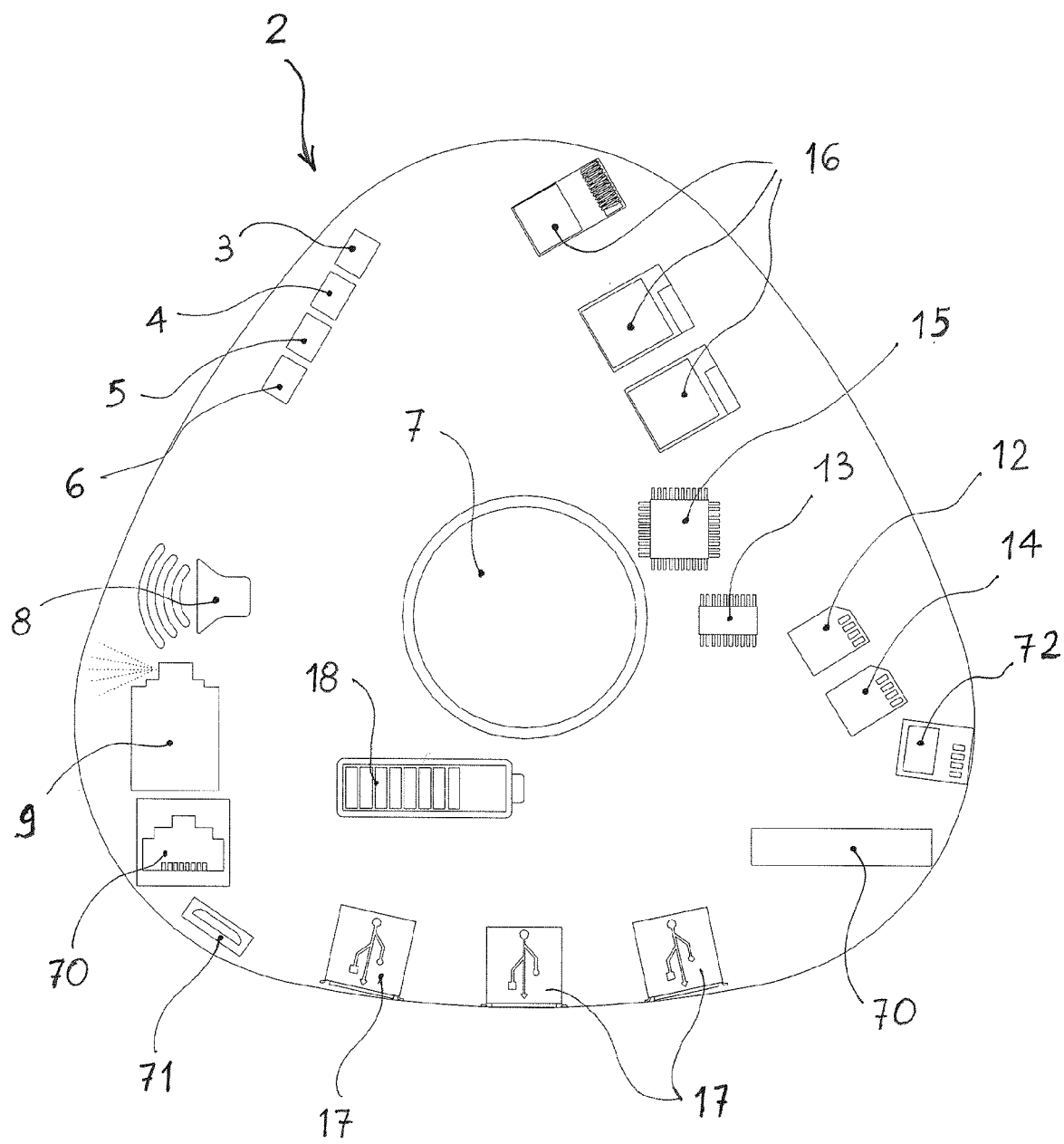
FIG. 6—a schematic top view of the devices inside the multiprotocol control unit.
Figure 7:
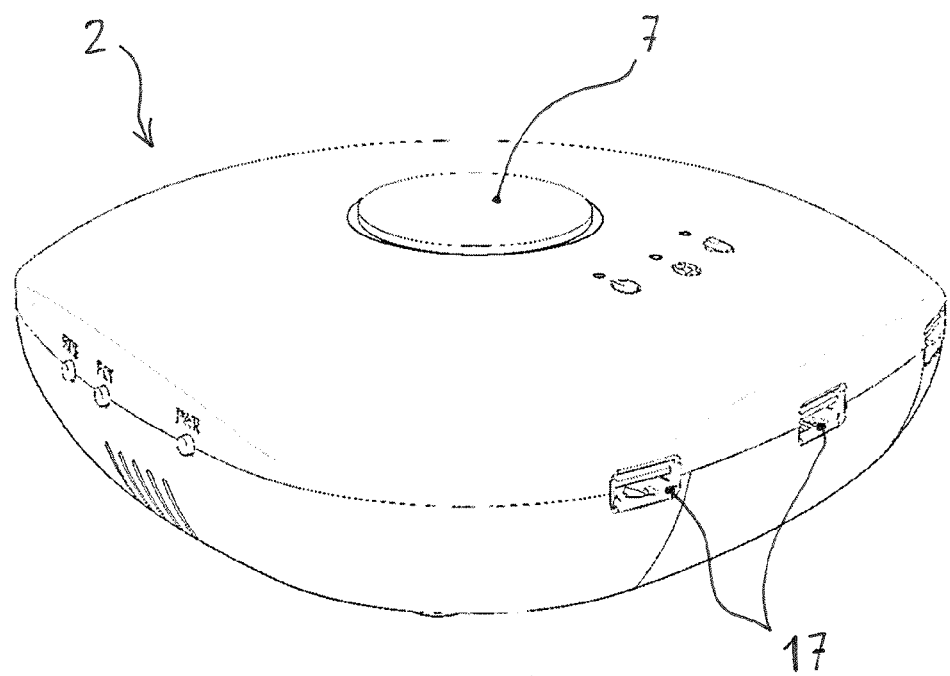
FIG. 7—an axonometric top view of the multiprotocol control unit.
Figure 8:
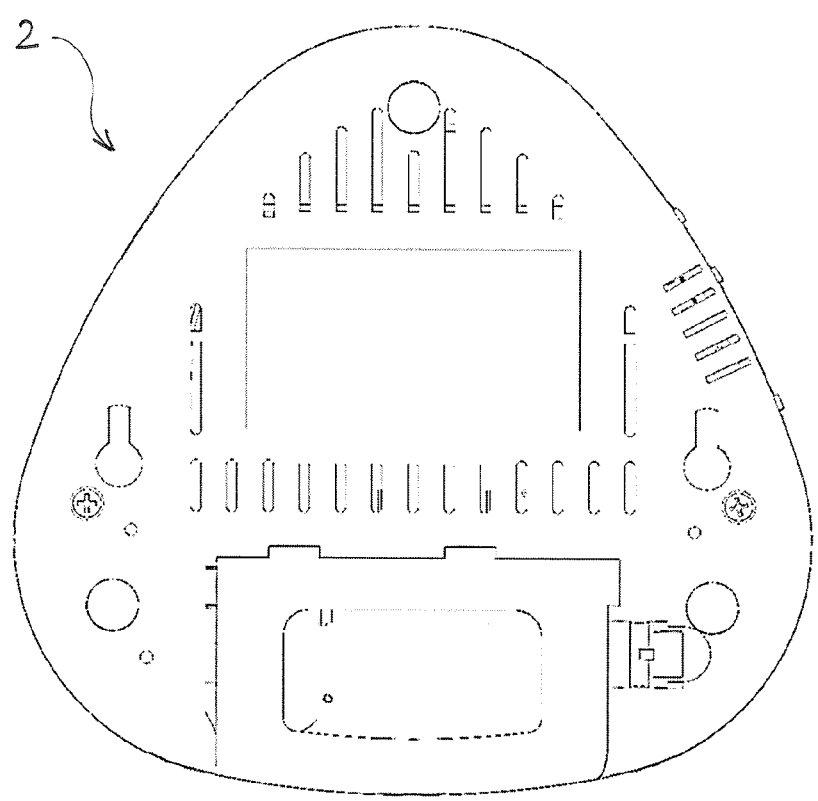
FIG. 8—a bottom view of the multiprotocol control unit.

The multiprotocol control unit 2 also includes data memory 14, a microprocessing unit 15, RAM memory 13, and program memory 12 wherein software 80 resides, therefore it is allowed to execute programs and process signals coming from the different internal and external sensors (see FIG. 6).

Said program memory 12 and data memory 14 may be accessed externally by means of a dedicated connector 72, therefore they can be either internally welded to the printed circuit board of the control unit 2 and externally inserted into connector 72.

Said control unit 2 also has a plurality of connectors 70, for the wired connection to local LANs, and a Power-over-USB connector 71 for connection of the same control unit 2 to the power grid by means of an external power supply 19; said power supply USB/PLC converter includes an intelligent device suitable for the conversion of a USB protocol in corresponding Power Line Communication protocol; said power supply can be also equipped with the Smart Plug type electrical consumption measurement function. In the event of a network power failure, the intelligent device continues to operate for several hours due to the battery 18 contained within the control unit 2.

The control unit 2 also has a plurality of input ports 17 which are universal Input-Output serial ports (USB) and the like for the connection of the control unit to the external modems 30 and/or to the external actuator means 20, said connection can also occur via internal wireless modem 16 such as Wi-Fi or by means of LAN ports 70.

The control unit 2 contains various types of sensor means:
one or more microphonic sensors 3;
a relative humidity sensor 4;
a temperature sensor 5 and,
an atmospheric pressure sensor 6.

The microphonic sensor 3 picks up the environmental noise and, depending on the wavelength of the detected noise (noises or specific sounds emitted by people) is able to detect the presence of the user in the environment wherein the control unit is located.

The relative humidity sensor 4 captures the variations in humidity that help to indicate the presence of people in the environment.

The temperature sensor 5 can register a temperature variation connected either to the activation of conditioning systems and to the temperature variation in time that indicates the presence of people in the environment.

The atmospheric pressure sensor 6 contributes to the determination of the presence of people parameter, either in the case in which the person is present and moves in the environment determining an atmospheric pressure variation, or in the case in which the person is stationary and open window which would result in an atmospheric pressure change due to the ventilation of the room.

Figure 2:
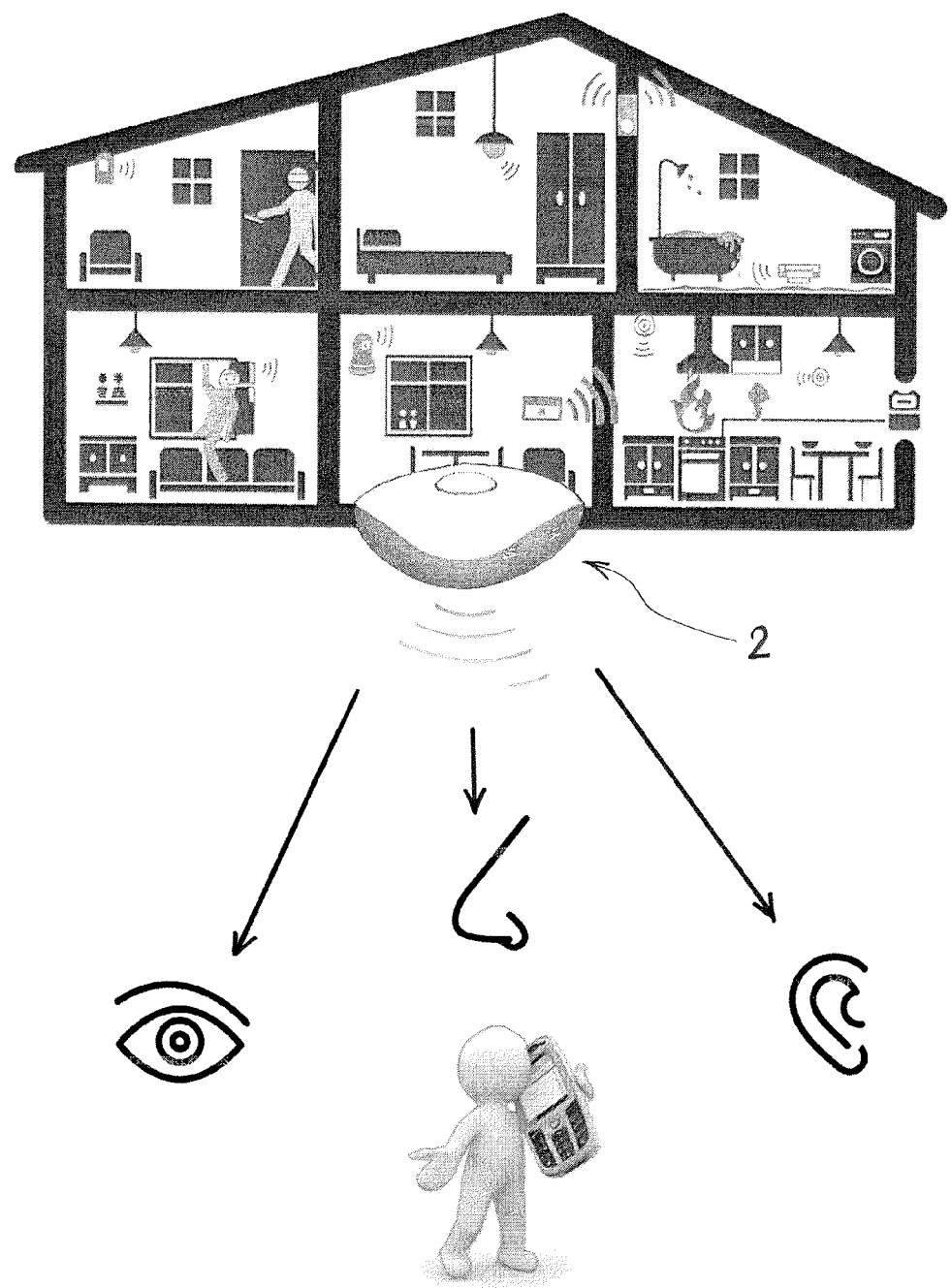
FIG. 2—a schematic view of multi-sensorial interaction between the user and the multiprotocol control unit-device located in the reference environment.

Regarding the external sensors, schematically shown in FIG. 2, they are in particular:
smartphone for bluetooth visibility signal emission;
single and/or dual technology motion sensors, in particular IR/microwave;
CO2 sensors or other gases;
window opening sensor;
air temperature and humidity sensors in rooms where the control unit is not located;
brightness sensors;
meters for measuring global consumption of electricity, water, gas and photovoltaic electrical parameters;
any smart plug-type device;
smartphones by means of specific mobile applications;
vibration sensors.

In particular, the power of the Bluetooth visibility signal coming from the smartphone 50 allows to track the distance of each individual user that has enabled the function.

The single and/or dual technology motion signal is processed either by the control unit or, sent to the server by means of internet, is processed by the back-end software means to filter false alarms and indicate the presence of people in the building/environment.

The signals from CO2 sensors and other gases are also used as possible variables in case of indication of the presence of the user in the environment.

The signals coming from window opening sensors may indicate either the possibility of operating certain executions on conditioning and heating systems, and may also contribute to the processing the signal of the presence of the user in the environment also in function of the atmospheric pressure sensor 6.

Signals from the brightness sensors are used not only in the algorithms that control the switching on and off of the building lights, but also in the algorithms that contribute to the determination of the user presence in the environment; said sensors will therefore detect a sudden change in brightness due either to the turning on of a lamp activated from a user who is entered in the building or for example at the opening of a window, or at the opening of shutters, actions that are related to the presence of the user in the environment.

The measuring signals from water, gas and light consumption meters, including electrical parameters of photovoltaic meters, as well as allowing to measure, store and process the consumptions for any other purpose of building energy monitoring and control, also help to determine the presence of people over long periods, since in the event of a long-term absence of people in the building, the consumptions decrease steadily.

The power consumption measurement signals from so-called smart plugs 11, power socket for individual electrical utilities (washing machine, lamp, etc.), from which it can be traced back the habits of the user, when an electrical load suddenly starts, contribute to indicate also the presence of the user in the environment.

Signals coming from user smartphones by means of a specific application, both in terms of voluntarily input provided by the user and in terms of smartphone internal sensing, such as accelerometer and others, provide information about user habits and also data that the user can voluntarily include:
warning of the presence even if motion sensors do not detect it, in order to eliminate false signals; in this case the application verifies the presence of the user;
warning of the movement of the smartphone by means of internal accelerometer; the application provides a notification request to the user if he/she feels the right comfort in the room/environment where he/she is located, or ask to confirm the input values coming from sensors and related to the state of the home (confirmation that an appliance has been wrongly forgotten switched on, or that a window is open)
planning the presence of the user in the reference environment by aligning the personal calendar (like Google calendar or other) to the application.

Signals coming from vibration sensors in the audible and ultrasonic range, provide indications concerning safety and state of maintenance of the building supporting structures, and also as a complement to microphonic sensor 3 to detect the presence of people by noise emission that the same produce moving and/or talking.

These signals provided by said external sensor 10 provide additional information, in addition to those detected by the internal sensor 11, which are processed either by the control unit 2 by means of software 80 or by the back-end software 90 on remote server 100, also virtualized in the cloud.

The main purpose of the software 80 is the determination of one or more environmental parameters, which are simply the state of the building, and the communication of said state by means of multisensory actuator means, internal actuator means 7, 8, 9, and external actuator means 20. For such purpose, software 80 provides and process an additional input information, namely the probability index of user presence, in addition to the processing of values coming from internal sensor means 3, 4, 5, 6 and respectively external 10, 11.

Therefore the software 80, after the processing of said probability index, processes a first and a second value relative to said reference environment, detected by the same internal sensor means 3, 4, 5, 6 and external 10, 11, and said probability index, to obtain at least a first and a second environmental parameter relating to an environmental condition of the reference environment.

Figure 4:
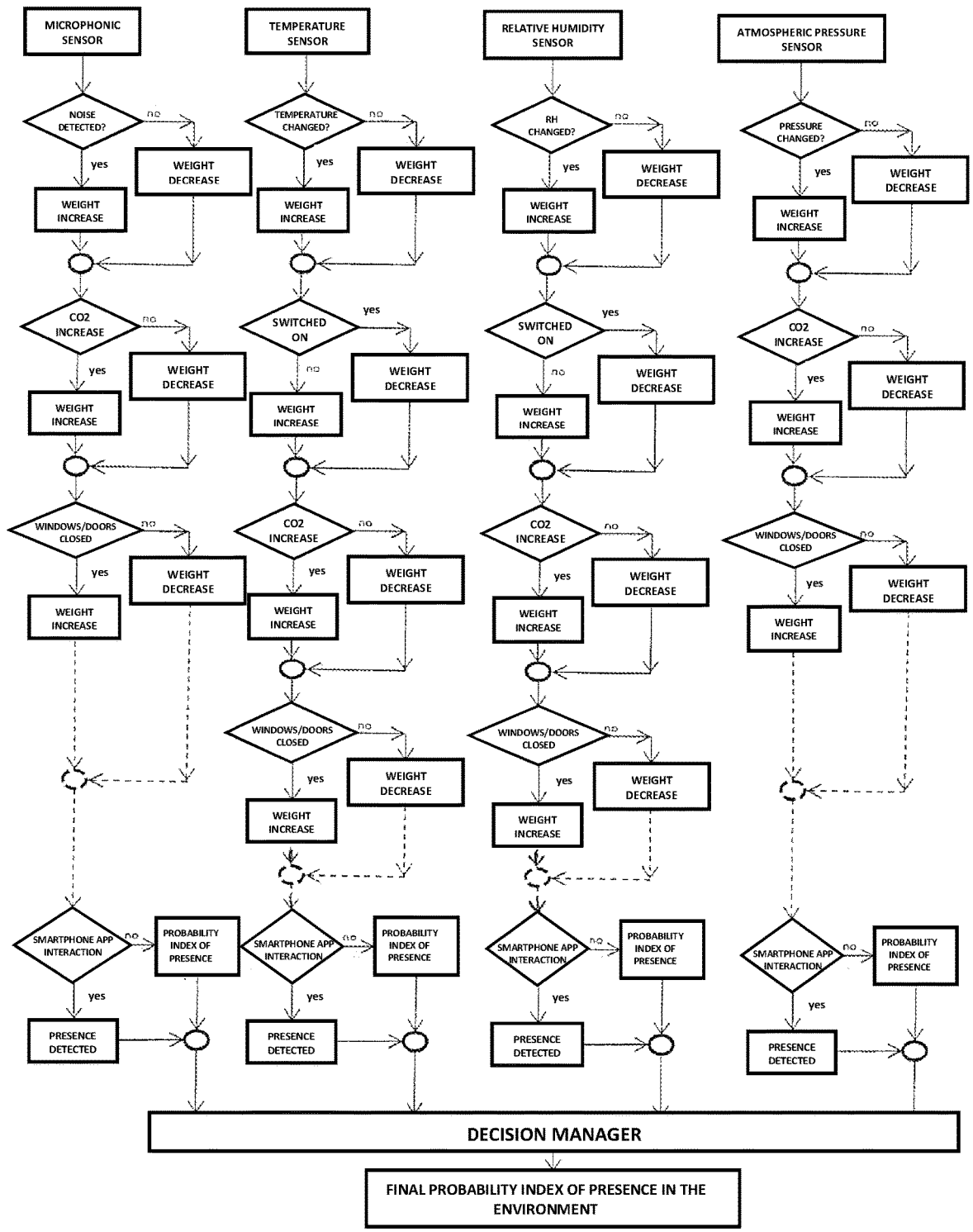
FIG. 4—a detailed block diagram of one of the data processing functions (that is, the presence of the user in the environment) of FIG. 3 by the software of the multiprotocol control unit.

In order to determine the probability index of the presence of the user, the software 80 processes, in relation to a corresponding first value detected by the internal sensors (human voice detection, temperature rise and relative humidity, and atmospheric pressure variation), an incremental weight value of a second value detected by some external sensors (including closed window sensor, CO2 sensor, brightness sensor, air conditioner switched off sensor, consumption variation sensor, smart plug, smartphone bluetooth); FIG. 4 shows in the first line the first parameters related to internal sensors and then, in cascade, only few parameters for the external sensors up to n parameters of the external sensors expressed by a hatch.

The software 80 once processed said a probability index of the presence of a user in the reference environment, forwards a confirmation request of the presence to at least one PC terminal 40, respectively at least one mobile device 50 provided with software configured as an application 200, to operative interact with said software 80.

The intentional user response to software configured as an application 200 by means of mobile device 50, assures the presence of the user in the environment.

The software 80 of the control unit 2, on the basis of signals coming from only internal sensors, provides also an effective and reliable warning about the detection of users in the building.

The user can therefore be identified as present in the reference environment with a low cost but effective solution, even without the need of external sensors, often unreliable: this detection is essential for all control criteria that the control unit 2 can perform, that is to produce the processing outputs by means of its own software 80 and to manage several external actuators 20 located in the building.

Figure 3:
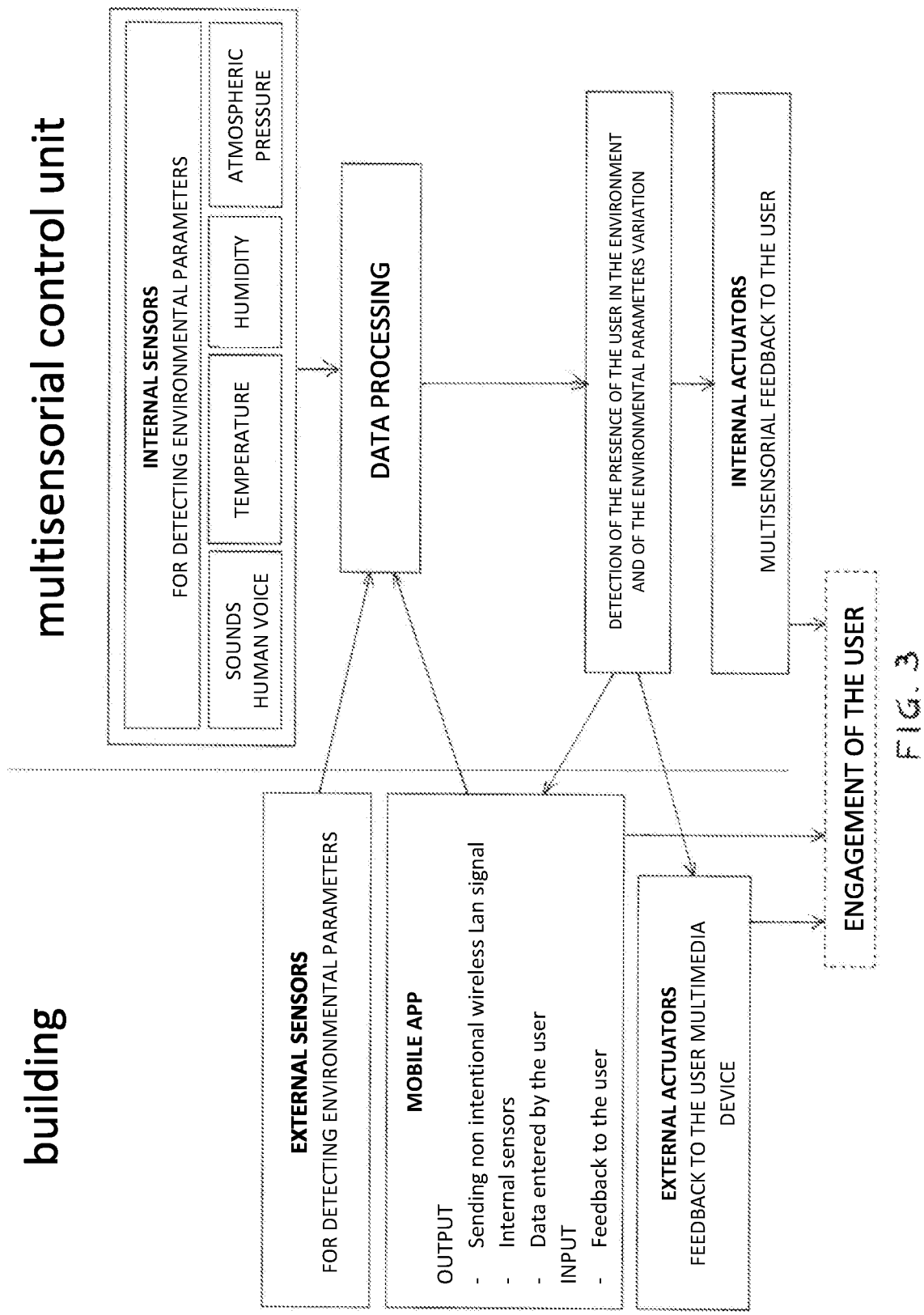
FIG. 3—a block diagram illustrating the interaction between the control unit and the reference environment (building) and processing of data from internal and external sensors performed by the control unit in order to determine the state of the building, depending on the user's presence and the variation of the environmental parameters and communicating it to the user to produce the engagement of the same by means of sensory actuators internal and external to the control unit.

When the software 80 has processed the data coming from the internal and eventually external sensors, and has also determined in a more reliably manner the status or the presence of the users in the building, will determine one or more environmental parameters that represent the state of the building and will send commands; the multiprotocol control unit 2 will send multisensory feedback to the user via the internal actuators (FIG. 3) whose functions are listed below in detail with the same actuators:

light signaling emitted by multicolored led device 7;
acoustic signaling by means of loudspeaker 8;
olfactory warning emitted by means of a sprayer/vaporizer of fragrances 9.

In particular, multicolored LED 7 can produce infinite color combinations by modulating light intensity and color gradations; moreover, said multicolored led 7 has a circular crown-shaped external face.

The loudspeaker 8 has an alert function for the user on the state of the building by emitting and reproducing sounds and music tracks.

The nebulized and/or vaporized fragrances dispensing device 9 informs the user by emitting at least two fragrances, one associated with a positive state of the building and one associated with a negative state of the building.

These internal actuators 7, 8, and 9 holded in the multiprotocol control unit 2 provide to the user a multisensory feedback message through an original combination of color, sound and fragrances, thus contributing to the continuous engagement with the user.

The user can choose to customize the multisensory feedback message provided by internal actuators 7, 8 and 9, or customize the color combinations and the duration of the light signal, the type and duration of sounds and the type of smell, also via the web browser interface usable from any PC terminal 40 or similar wherever the user has access to a public data network by connecting to the physical or virtual server 100 where the back-end software is resident or even via the interface of the application installed on its mobile device 50 that connects either to the control unit 2 via the router-modem 30 and the back-end software 90.

Therefore, computer means of the control unit 2 are provided with dedicated software means for remote programming and not of one or more operational parameters of said internal actuator means 7, 8, 9, of said external actuator means 20, of said an internal sensor means 3, 4, 5, 6, and respectively of said external sensor means 10, 11.

The system also provides the actuators 20 external to the control unit 2, including a smartphone 50, whose functions are listed in detail below:

informative notification sent to the user through a specific application 200 for smartphones;
on-off controls for electrical loads such as appliances, lamps, etc.;
infrared or radio-frequency wall-mounted commands for appliances with IR or RF receivers;
valve controls for individual radiators/heaters and for water and gas pipes, including boiler and thermostat controls.

Informative notification sent to the user through a specific smartphone application 200 are de facto a lean decision support system; said informative features of the application 200, greatly enhance the level of interaction of the system with the user and provide an incentive for the user, on one hand, to improve their awareness of the consumption in the home and its energy behaviors and, on the other, it may be stimulated to provide feedback as a response to the notifications that come through the application 200, inserting input to the system in terms of confirmations to reduce the uncertainty of its position and behavior and of what is happening in the building.

The mobile device 50 by means of application 200 therefore behaves either as a virtual sensor and actuator receiving and sending feedback information messages.

The mobile device 50 and the PC terminal 40 respectively comprise software means configured as an application 200 for operative interaction with the control unit 2, respectively with said remote server 100.

The remote server 100 is implemented with back-end software means 90 for operating interaction with said control unit 2, said PC terminal 40, respectively, with said mobile device 50.

Figure 5:
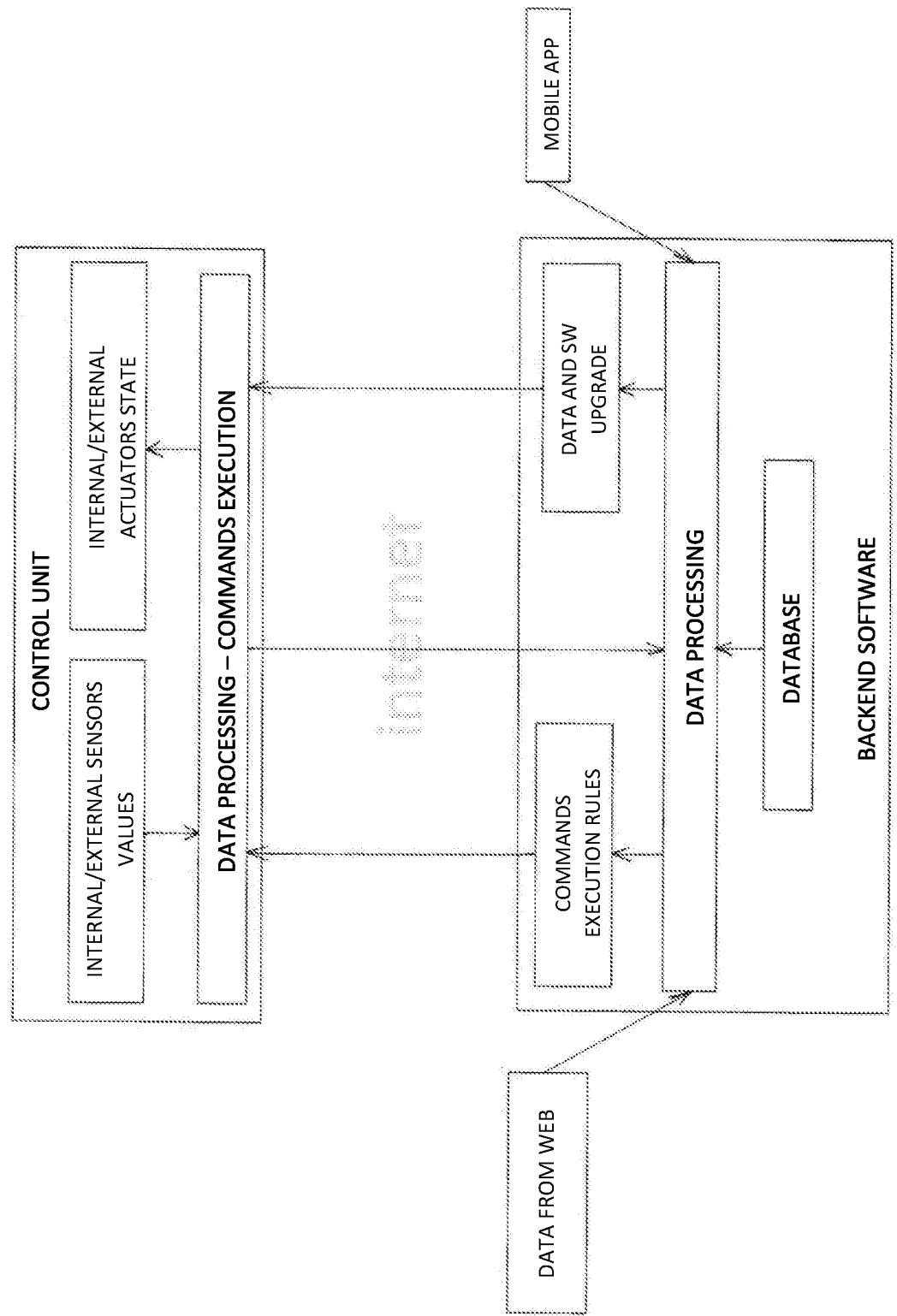
FIG. 5—a block diagram of activities performed by server-based or cloud-based back-end software and its interaction with the multiprotocol control unit.

The application 200, typically used on mobile devices, but also on PC, communicates with both the multiprotocol control unit 2, with its own software 80, and with the back-end software 90, both sending inputs for the control unit and for the back-end software, and receiving output from the control unit and the back-end software; in particular the user by means of the application, will communicate with the control unit if he is present in the building and with the back-end via internet when he is outside the building (FIG. 5).

Therefore, the user will receive interactive feedback in user-friendly mode, including the gamification mode, both from the control unit 2 and the back-end software 90 on the server 100, and the control unit 2 will be privileged when the mobile device 50 is in the wireless communication range of the building and/or housing.

The multisensory feedback can be related not only to the status of the building, but also to other specific alerts generated by business intelligence and data analysis algorithms that can reside in back-end software 90.

A final aspect of this description is the functionality of the system 1 to store and process the data, function that is realized both by the software 80 of the control unit, and by the back-end software 90, which can also transmit to the control unit 2 instructions and rules to implement commands and update the data; these functionalities are contained in the back-end software 90 running on server 100 or even in cloud; the server 100 has a database and algorithms for calculating consumption and providing feedback to the user through the application 200, to reduce consumption and gain awareness of building consumption with the same comfort functionality.

Regarding the processing function performed by the back-end software 90, said processing function takes place on three distinct data streams:

data transmitted by the control unit;
data contained in its database, relating to a plurality of control units;
data coming from the web, whether they are open data repositories or provided by third party web services.

Further, the system 1 via back-end software 90 sends the instructions to the control unit 2 which in turn performs commands to the external actuators 20; the back-end software 90 can operate the automatic data update of the software 80 of the multiprotocol control unit and also the introduction of new devices introduced into the home (scalability of the system), making the system always remotely updatable.

If the network connection is absent, the multiprotocol control unit 2 is able to continue the monitoring and is able to re-aligning just after the connection to the web resets.

The system is modular as it consists of independent subsets that share communication interfaces and cooperate with each other, it is scalable because it is capable of increasing and decreasing in its capabilities depending on the user's needs.

The user can therefore start with a simplified base kit, made by a control unit and an consumption measurement device, whose features can be improved with the free market acquisition of any motion sensor, so that temperature sensors and relative humidity sensors to be positioned per room, as well as smart plugs and wireless valves, sensors and actuators.

Process

The system implementation process of the present invention by means of the control unit 2 comprises the following steps:

detecting, through said sensors 3, 4, 5, 6, internal respect to the control unit 2, at least one first value regarding a reference environment;

detecting, by means of said sensors 10, 11, external respect to control unit 2, at least a second value regarding said reference environment;

processing, by means of said software means 80, dedicated and residing on said computer means of the control unit 2, an incremental weight value of said at least first, respectively second, value regarding said reference environment, and processing a probability index of presence of a user in the reference environment, on the basis of said incremental weight value in this way obtained;

processing, by means of said software means 80, residing on said computer means of the control unit 2, at least a first, respectively second, value relating to said reference environment, respectively said probability index, and obtaining at least a first, respectively a second, corresponding environmental parameter relating to at least one environmental condition of the reference environment; one or more environmental parameters represent, together, a state of the building;

forwarding, on the basis of said first, respectively second, environmental parameter, a command to said internal actuator means 7, 8, 9, respectively external 20, with respect to the control unit 2, for generating at least a sensory feedback message to the user, relative to one or more conditions of said reference environment.

One or more environmental parameters represent the state of the building.

Once obtained said probability index, it is possible to forward a request for confirmation of the presence of the user to a PC terminal 40 and/or a mobile device 50 provided with dedicated software 200 for operating interaction with software 80 resident in the control unit 2.

Once the software 80 has processed the data from the internal and external sensors, and has determined the presence probability index of the user in the reference environment, the state of the home will be elaborated and the multiprotocol control unit 2 will send a multisensory feedback to the user by means of internal and external actuators. The software 80 performs the processing of a first and second value relative to said reference environment, detected by internal sensors 3, 4, 5, 6 and respectively external 10, 11, and said probability index so as to obtain at least one first and second corresponding environmental parameters, relating to at least one condition (state) of the reference environment, and for forwarding, on the basis of said parameters thus obtained, at least one command to said internal actuators means 7, 8, 9 and external 20 to provide the user with at least one sensory feedback message relative to one or more conditions of said reference environment.

The object of the invention is subject to numerous modifications and variations, all of which are within the inventive concept as set forth in the attached claims.

All details may be replaced by other technically equivalent elements as required, without departing from the scope of the present invention.

Even if the object has been described with particular reference to the attached figures, the reference numbers used in the description and claims are used to improve the intelligence of the invention and do not constitute any limitation to the scope of protection claimed.

The invention claimed is:

1. Intelligent system for monitoring a reference environment, comprising:

at least one multiprotocol control unit, provided with at least one internal wireless modem, a power supply connector, a microprocessing unit, RAM memory means, program memory means and data memory means;

at least one modem, respectively a modem-router, external with respect to the control unit and operatively connected to the same;

a plurality of actuator means external with respect to the control unit;

sensor means internal with respect to the control unit which are, individually or in combination, at least a microphonic sensor, a relative humidity sensor, a temperature sensor, an atmospheric pressure sensor or the like, capable to detect at least a first value of the reference environment;

sensor means external with respect the control unit, operatively connected to the control unit, capable to detect at least a second value of the reference environment;

computer means internal to said control unit, provided with software means for processing at least a first value of said reference environment, detected by means of said internal sensor means, and at least a second value of said reference environment, detected by means of said external sensor means, for obtaining at least a first environmental parameter, corresponding to the first value, and at least a second environmental parameter, corresponding to the second value, referring to at least one environmental condition of the reference environment, and forwarding, on the basis of said parameters in this way obtained, at least one command to:

actuator means, internal with respect to the control unit, which are, individually or in combination, multicolor light emitter means, loudspeaker means, a nebulized and/or vaporized fragrances dispensing device or the like, and external, wherein said intelligent system for monitoring a reference environment is suitable for multisensorial interaction with a user, and said software means are also able to process at least one probability index of presence of the user in the reference environment, on the basis of said at least a first value detected by means of said internal sensors means and on the basis of said at least a second value detected by means of said external sensors means, and in that said actuator means are able to provide at least one sensory feedback message referring to one or more conditions of said reference environment to the user.

2. Intelligent system according to claim 1, wherein said software means, residing on said computer means of the control unit, are suitable for forwarding, on the basis of said probability index of presence of a user in the reference environment, a presence confirmation request to at least one PC, alternatively to at least one mobile device, provided with dedicated software means, for the operative interaction with said software means residing on said computer means of the control unit.

3. Intelligent system according to claim 2, wherein said mobile device, alternatively said PC, comprises software means configured as an application for the operative interaction with the control unit, and with said remote server.

4. Intelligent system according to claim 2, wherein said remote server is implemented with back-end software means for the operative interaction with said control unit, with said PC, alternatively with said mobile device.

5. Intelligent system according to claim 4, wherein said back-end software means are suitable for automatically performing the updating from remote of said software means, residing on said computer means of the control unit.

6. Intelligent system according to claim 1, wherein said external sensor means comprise a consumption measurement device.

7. Intelligent system according to claim 1, further comprising a remote server provided with dedicated software means for the remote programming of one or more operation parameters of said internal actuator means, of said external actuator means, of said internal sensor means, of said external sensor means.

8. Intelligent system according to claim 1, wherein said computer means of the control unit are provided with dedicated software means for setting one or more operation parameters of said internal actuator means, of said of external actuator means, of said internal sensor means, of said external sensor means.

9. Intelligent system according to claim 1, wherein at least one of said sensor means internal with respect to the control unit is an atmospheric pressure sensor.

10. Intelligent system according to claim 1, wherein at least one of said actuator means internal with respect to the control unit is a nebulized and/or vaporized fragrances dispensing device.

11. Intelligent system according to claim 1, wherein it comprises a power supply USB/PLC converter electrically connected to said connector of the control unit, including an intelligent device suitable for the conversion of a USB protocol in corresponding Power Line Communication protocol.

12. A process for the monitoring of a reference environment, implemented through a control unit, comprising:

detecting, through sensor means, internal respect to an electronic control unit, at least a first value regarding a reference environment;

detecting, by means of said sensor means, external respect to the control unit, at least one second value regarding said reference environment;

processing, by means of software means, dedicated and residing on computer means of the control unit, an incremental weight value of said at least one second value, with reference to at least a corresponding first value regarding said reference environment;

processing, by means of said software means, residing on said computer means of the control unit, said at least a first value relating to said reference environment, and said at least one second value relating to said reference environment, and obtaining at least a first, and a second, corresponding environmental parameter relating to at least one environmental condition of the reference environment;

forwarding, on the basis of said at least a first and second environmental parameter, a command to said internal, and external actuator means, with respect to the control unit, wherein said intelligent system for monitoring a reference environment is suitable for multisensorial interaction with a user, and in that the method further comprises:

processing by means of said software means also at least one probability index of presence of the user in the reference environment, on the basis of said incremental weight value, and providing to the user by said actuator means at least one sensory feedback message referring to one or more conditions of said reference environment.

13. A process according to claim 12, wherein said at least one sensor means internal with respect to the control unit is an atmospheric pressure sensor.

14. A process according to claim 13, wherein said internal actuator means is at least a nebulized and/or vaporized fragrances dispensing devices.

15. A process according to claim 12, further comprising said server having a database and algorithms for calculating consumption and providing feedback to the user to allow the user to reduce consumption and gain awareness of building consumption with the same comfort functionality.

\* \* \* \* \*